(12) United States Patent
Yang et al.

(10) Patent No.: US 11,870,296 B2
(45) Date of Patent: Jan. 9, 2024

(54) UNINTERRUPTIBLE POWER SYSTEM AND OPERATION METHOD THEREOF

(71) Applicant: Cyber Power Systems, Inc., Taipei (TW)

(72) Inventors: Kai-Tsung Yang, Taipei (TW); Jui-Hung Chou, Taipei (TW); Fang-Yu Hsu, Taipei (TW); Shou-Ting Yeh, Taipei (TW)

(73) Assignee: CYBER POWER SYSTEMS, INC., Taipei (JP)

( * ) Notice: Subject to any disclaimer, the term of this patent is extended or adjusted under 35 U.S.C. 154(b) by 0 days.

(21) Appl. No.: 17/528,933

(22) Filed: Nov. 17, 2021

(65) Prior Publication Data

US 2022/0376547 A1   Nov. 24, 2022

(30) Foreign Application Priority Data

May 20, 2021   (CN) .................. 202110551789.X

(51) Int. Cl.
*H02J 9/06*   (2006.01)
*H02J 7/00*   (2006.01)

(52) U.S. Cl.
CPC .......... *H02J 9/062* (2013.01); *H02J 7/0048* (2020.01); *H02J 7/007194* (2020.01)

(58) Field of Classification Search
CPC ..... H02J 9/062; H02J 7/007194; H02J 7/0048
USPC ....................................... 307/64, 23
See application file for complete search history.

(56) References Cited

U.S. PATENT DOCUMENTS

| | | | | |
|---|---|---|---|---|
| 6,680,547 B1* | 1/2004 | Dailey | ............ | H02J 3/28 307/29 |
| 2013/0214604 A1* | 8/2013 | Johnson, Jr. | ............ | H02J 9/062 307/64 |
| 2016/0013646 A1* | 1/2016 | Akerson | ............ | H02J 13/00004 307/39 |
| 2016/0054771 A1* | 2/2016 | Fallon | ............ | H02J 9/062 713/300 |
| 2018/0287408 A1* | 10/2018 | Kutkut | ............ | H02J 9/062 |
| 2022/0285976 A1* | 9/2022 | Galuppi | ............ | H02J 9/005 |

FOREIGN PATENT DOCUMENTS

| TW | M241880 U | 8/2004 |
|---|---|---|
| TW | 202034602 A | 9/2020 |

\* cited by examiner

*Primary Examiner* — Michael R. Fin
(74) *Attorney, Agent, or Firm* — BACON&THOMAS, PLLC

(57) ABSTRACT

An uninterruptible power system and an operation method thereof are provided. The uninterruptible power system comprises a DC-AC conversion circuit, a plurality of switches, a plurality of sensing units, a plurality of output ports and a control unit. Each output port is electrically coupled to an output terminal of the DC-AC conversion circuit sequentially through one of the sensing units and one of the switches. The control unit is configured to define members of at least one group from the output ports according to a system setting, and define which members of each group are non-critical output ports according to the system setting. The control unit is further configured to set, according to the system setting, at least one condition for all non-critical output ports in each group to simultaneously stop supplying power, and to accordingly control the operations of the corresponding switches.

10 Claims, 4 Drawing Sheets

UNINTERRUPTIBLE POWER SYSTEM AND OPERATION METHOD THEREOF

BACKGROUND OF THE INVENTION

Field of the Invention

The present invention relates to the field of power supplying, and more particularly to an uninterruptible power system and an operation method thereof.

Description of Related Art

At present, uninterruptible power systems (UPS) with multiple output ports have appeared on the market. The output ports of such an uninterruptible power system are divided into multiple groups (or called banks) to control them respectively. However, since the output port groups of such an uninterruptible power system are all defined at the time of manufacture, this makes the uninterruptible power system lack flexibility in use.

SUMMARY OF THE INVENTION

An object of the present invention is to provide an uninterruptible power system, which can define members of at least one group from the output ports according to a system setting inputted by a user, thereby improving flexibility in use.

Another object of the present invention is to provide an operation method of the above-mentioned uninterruptible power system.

To achieve the above objective, the present invention provides an uninterruptible power system, which comprises a DC-AC conversion circuit, a plurality of switches, a plurality of sensing units, a plurality of output ports and a control unit. Each switch has a first terminal, a second terminal and a control terminal, and the first terminals are electrically coupled to an output terminal of the DC-AC conversion circuit. An input terminal of each sensing unit is electrically coupled to one of the second terminals for sensing at least one of voltage and current. Each output port is electrically coupled to an output terminal of one of the sensing units. The control unit is electrically coupled to the DC-AC conversion circuit, the control terminals of the switches and the sensing units. The control unit is configured to define members of at least one group from the output ports according to a system setting, and define which members of each group are non-critical output ports according to the system setting. The control unit is further configured to set, according to the system setting, at least one condition for all non-critical output ports in each group to simultaneously stop supplying power, and to accordingly control the operations of the corresponding switches.

To achieve the above objective, the present invention also provides an operation method of an uninterruptible power system. The uninterruptible power system comprises a DC-AC conversion circuit, a plurality of switches, a plurality of sensing units and a plurality of output ports. Each switch has a first terminal, a second terminal and a control terminal, and the first terminals are electrically coupled to an output terminal of the DC-AC conversion circuit. An input terminal of each sensing unit is electrically coupled to one of the second terminals for sensing at least one of voltage and current. Each output port is electrically coupled to an output terminal of one of the sensing units. The operation method comprises the following steps: defining members of at least one group from the output ports according to a system setting; defining which members of each group are non-critical output ports according to the system setting; and setting, according to the system setting, at least one condition for all non-critical output ports in each group to simultaneously stop supplying power, and to accordingly control the operations of the corresponding switches.

In order to make the above objects, technical features and gains after actual implementation more obvious and easy to understand, in the following, the preferred embodiments will be described with reference to the corresponding drawings and will be described in more detail.

BRIEF DESCRIPTION OF THE DRAWINGS

Other features and advantages of the present invention will become apparent in the following detailed description of the preferred embodiments with reference to the accompanying drawings, of which.

DESCRIPTION OF EMBODIMENTS

The characteristics, contents, advantages and achieved effects of the present disclosure will become more fully understood from the detailed description given herein below and the accompanying drawings which are given by way of illustration only, and thus are not limitative of the present disclosure.

As required, detailed embodiments are disclosed herein. It must be understood that the disclosed embodiments are merely exemplary of and may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Figure 1:
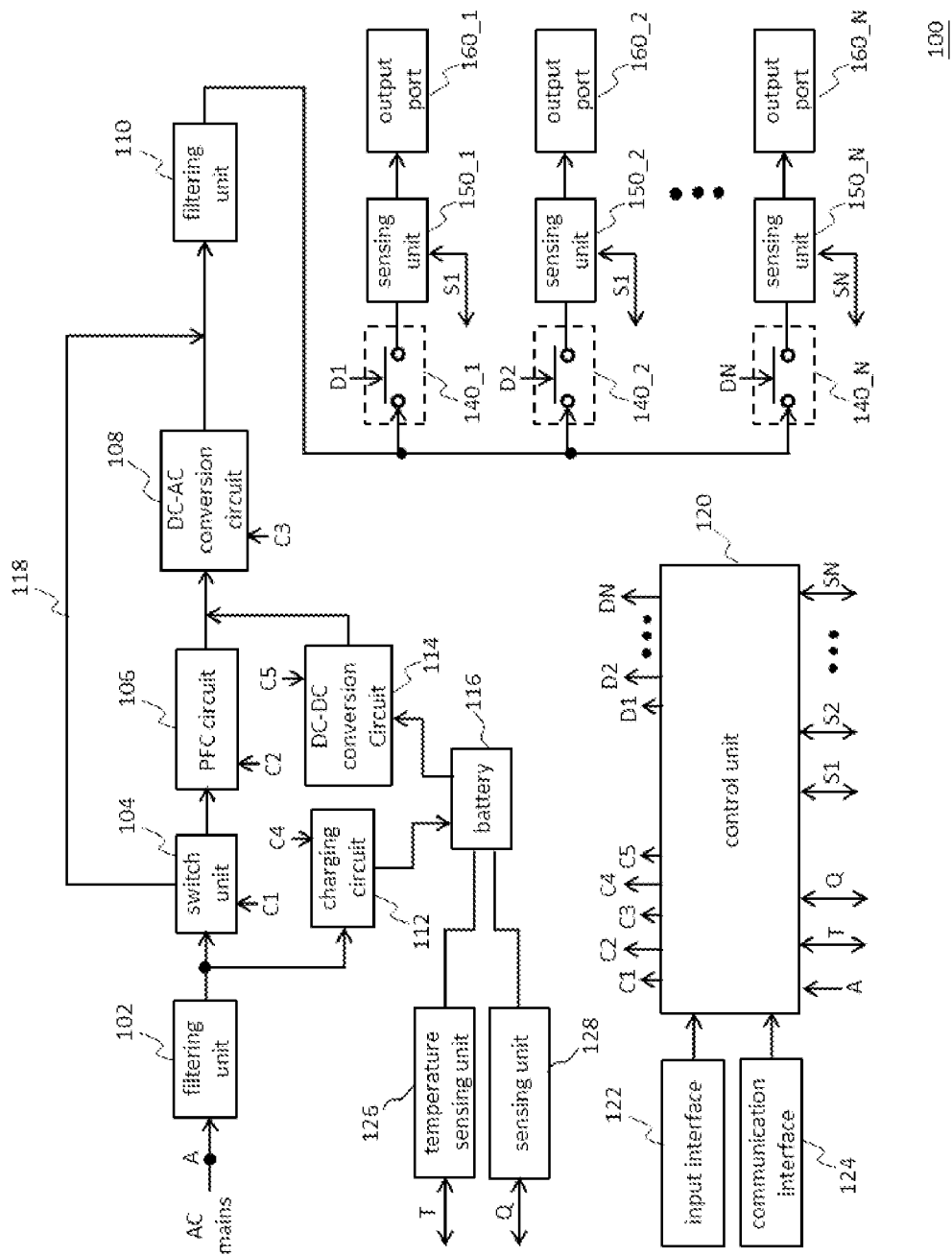
FIG. 1 is an uninterruptible power system according to an embodiment of the present invention.

FIG. 1 is an uninterruptible power system according to an embodiment of the present invention. Referring to FIG. 1, the uninterruptible power system 100 is an on-line uninterruptible power system (On-line UPS). The uninterruptible power system 100 comprises a filtering unit 102, a switch unit 104, a power factor correction circuit (PFC circuit) 106, a DC-AC conversion circuit 108, a filtering unit 110, a charging circuit 112, a DC-DC conversion Circuit 114, battery 116, bypass path 118, control unit 120, input interface 122, communication interface 124, temperature sensing unit 126, sensing unit 128, switches 140_1-140_N, sensing units 150_1-150_N, and output ports 160_1-160_N, Where N is a positive integer.

As shown in FIG. 1, an input terminal of the switch unit 104 and an input terminal of the charging circuit 112 are electrically coupled to the AC mains through the filtering unit 102, and the switch unit 104 is further electrically coupled to an input terminal of the filtering unit 110 and an output terminal of the DC-AC conversion circuit 108 through the bypass path 118. In this embodiment, the switch unit 104 is composed of at least one switch. An input terminal of the power factor correction circuit 106 is electrically coupled to the switch unit 104, and an output terminal of the power factor correction circuit 106 is electrically coupled to an input terminal of the DC-AC conversion circuit 108. An output terminal of the charging circuit 112 is electrically coupled to the battery 116. An input terminal of the DC-DC conversion circuit 114 is electrically coupled to the battery 116, and an output terminal of the DC-DC conversion circuit 114 is electrically coupled to the input terminal of the DC-AC conversion circuit 108. Each of the switches 140_1 to 140_N has a first terminal, a second terminal, and a control terminal, and the first terminals of these switches are electrically coupled to an output terminal of the filtering unit 110. An input terminal of each of the sensing units 150_1 to 150_N is electrically coupled to the second terminal of one of the switches for sensing at least one of voltage and current. Each output port is electrically coupled to an output terminal of one of the sensing units 150_1-150_N, and each output port is configured to supply power to at least one load (not shown).

In addition, the temperature sensing unit 126 and the sensing unit 128 are both electrically coupled to the battery 116. In this embodiment, the temperature sensing unit 126 is configured to sense at least one of temperature of the battery 116, internal temperature of the uninterruptible power system 110, and ambient temperature outside the uninterruptible power system 110. The sensing unit 128 is configured to sense remaining energy of the battery 116. The control unit 120 is electrically coupled to the switch unit 104, the power factor correction circuit 106, the DC-AC conversion circuit 108, the charging circuit 112, and the DC-DC conversion circuit 114, and is configured to provide control signals C1 to C5 to control their operations, respectively. For example, the control unit 120 can use the control signal C1 to control the operation of the switch unit 104, so that the switch unit 104 electrically couples the output terminal of the filtering unit 102 to the bypass path 118, or electrically couples the output terminal of the filtering unit 102 to the input terminal of the power factor correction circuit 106. The control unit 120 is further electrically coupled to the control terminal of each of the switches 140_1 to 140_N, and is configured to provide control signals D1 to DN to control the operations of these switches, respectively. For example, the control unit 120 can use the control signal D1 to control the switch 104_1 to be in on state or in off state.

The control unit 120 is further electrically coupled to the sensing units 150_1-150_N to control their operations, and receives the sensing data S1-SN respectively obtained by the sensing units 150_1-150_N. In this way, the control unit 120 can calculate the power consumption of the corresponding load according to the sensing data S1-SN. The control unit 120 is further electrically coupled to the temperature sensing unit 126 and the sensing unit 128 to control their operations, and receives the sensing data T and the sensing data Q obtained by the temperature sensing unit 126 and the sensing unit 128, respectively. In addition, the control unit 120 is further electrically coupled to the input interface 122, the communication interface 124 and the input terminal of the filtering unit 102. In this embodiment, the control unit 120 is further configured to receive the signal A on the input terminal of the filtering unit 102, and determine whether the AC power source (i.e., the AC mains) fails. In addition, in this embodiment, the control unit 120 is further configured to receive a system setting inputted by a user through the input interface 122 (details will be described later). The input interface 122 can be implemented by a touch panel or multiple physical buttons; however, this is not intended to limit the present invention.

After receiving the system setting, the control unit 120 defines members of at least one group from the output ports 160_1-160_N according to the system setting, and defines which members of each group are non-critical output ports according to the system setting. Take 8 output ports as an example. Assuming that the system setting received by the control unit 120 is used to create two groups, group 1 and group 2; assuming that in this system setting, group 1 consists of output ports 160_1, 160_3, 160_4, 160_5, and 160_6, and group 2 consists of output ports 160_2, 160_7, and 160_8; and assuming that the output ports 160_1-160_4 are non-critical output ports, then the control unit 120 will define the output ports 160_1, 160_3, 160_4, 160_5, and 160_6 as the members of group 1 according to the system setting, and define the output ports 160_2, 160_7, and 160_8 as the members of group 2 according to the system setting. In addition, the control unit 120 will define the output ports 160_1, 160_3, and 160_4 in the group 1 as non-critical output ports according to the system setting, and define the output port 160_2 in the group 2 as non-critical output ports according to the system setting. As for the other output ports in group 1 and the other output ports in group 2, the control unit 120 will automatically define them as critical output ports.

Next, the control unit 120 sets, according to the system setting, at least one condition for all non-critical output ports in each group to simultaneously stop supplying power, and to accordingly control the operations of the corresponding switches. The parameters considered in the conditions comprise at least one of power consumption of load, whether the AC mains fails, remaining energy of the battery 116, temperature of the battery 116, internal temperature of the uninterruptible power system 100, ambient temperature outside the uninterruptible power system 100, and a set counting time set by a user.

Assume that the system setting received by the control unit 120 sets three conditions for each of group 1 and group 2, as follows:

Group 1 (Load>M Watt||L2B||BatCap<40%)
Group 2 (Load>M Watt||L2B||BatCap<60%)

where Load represents the total power consumption of all loads of the corresponding group, L2B represents the failure of the AC mains, BatCap represents the remaining energy of the battery 116, and M is a positive number (i.e., a real number greater than 0). Then for group 1, when the total power consumption of all loads of group 1 is greater than M Watt, the AC mains fails, or the remaining energy of the battery 116 is less than 40%, the control unit 120 controls the operations of the switches 140_1, 140_3, and 140_4 to make these switches turn off, thereby causing all non-critical output ports in group 1 (i.e., output ports 160_1, 160_3, and 160_4) to simultaneously stop supplying power. For group 2, when the total power consumption of all loads of group 2 is greater than M Watt, the AC mains fails, or the remaining energy of the battery 116 is less than 60%, the control unit 120 controls the operation of the switch 140_2 to make this switch turn off, thereby causing all non-critical output ports in group 2 (i.e., the output port 160_2) to simultaneously stop supplying power.

It must be noted that the system setting described above is only for example, and is not intended to limit the present invention. Those skilled in the art should know that the content of the above system setting can be changed according to actual needs. For example, the system setting can create only one group, or create more than three groups. For another example, the system setting can define all members in at least one group as non-critical output ports, or define all members in at least one group as critical output ports. In addition, from the three conditions corresponding to group 1 and the three conditions corresponding to group 2, it can be seen that the parameters considered in these conditions comprise power consumption of load, whether the AC mains fails, and remaining energy of the battery 116. However, this is not intended to limit the present invention. Those skilled in the art should know that the quantity of the above conditions and the parameters considered in the conditions can be changed according to actual needs. For example, the system setting can set a single condition for one of the groups, and the parameter considered in this condition is, for example, a set counting time set by a user. Therefore, when the counting time reaches the set counting time set by the user (for example, four hours), the control unit 120 controls the operations of the corresponding switches of all non-critical output ports in this group, thereby causing all non-critical output ports in this group to simultaneously stop supplying power.

In addition, although in the above description, the control unit 120 receives the system setting inputted by the user through the input interface 122, this is not intended to limit the present invention. For example, assuming that the control unit 120 is further configured to execute a web server program to provide a web-based user interface, and that the web-based user interface is configured for a user to enter the system setting, then the control unit 120 can receive the system setting inputted by the user through the communication interface 124. Certainly, the web-based user interface comprises a Web interface, a SNMP interface (simple network management protocol interface) or a Telnet interface. In addition, the communication interface 124 can be a wired communication interface or a wireless communication interface, which is not limited by the present invention.

It is worth mentioning that, in this embodiment, whether to adopt the filtering unit 102, the filtering unit 110, the DC-DC conversion circuit 114, the input interface 122, the communication interface 124, the temperature sensing unit 126, and the sensing unit 128 can be determined by actual needs. In addition, the designer can further decide whether to electrically couple the control unit 120 to the input terminal of the filtering unit 102 according to actual needs.

Figure 2:
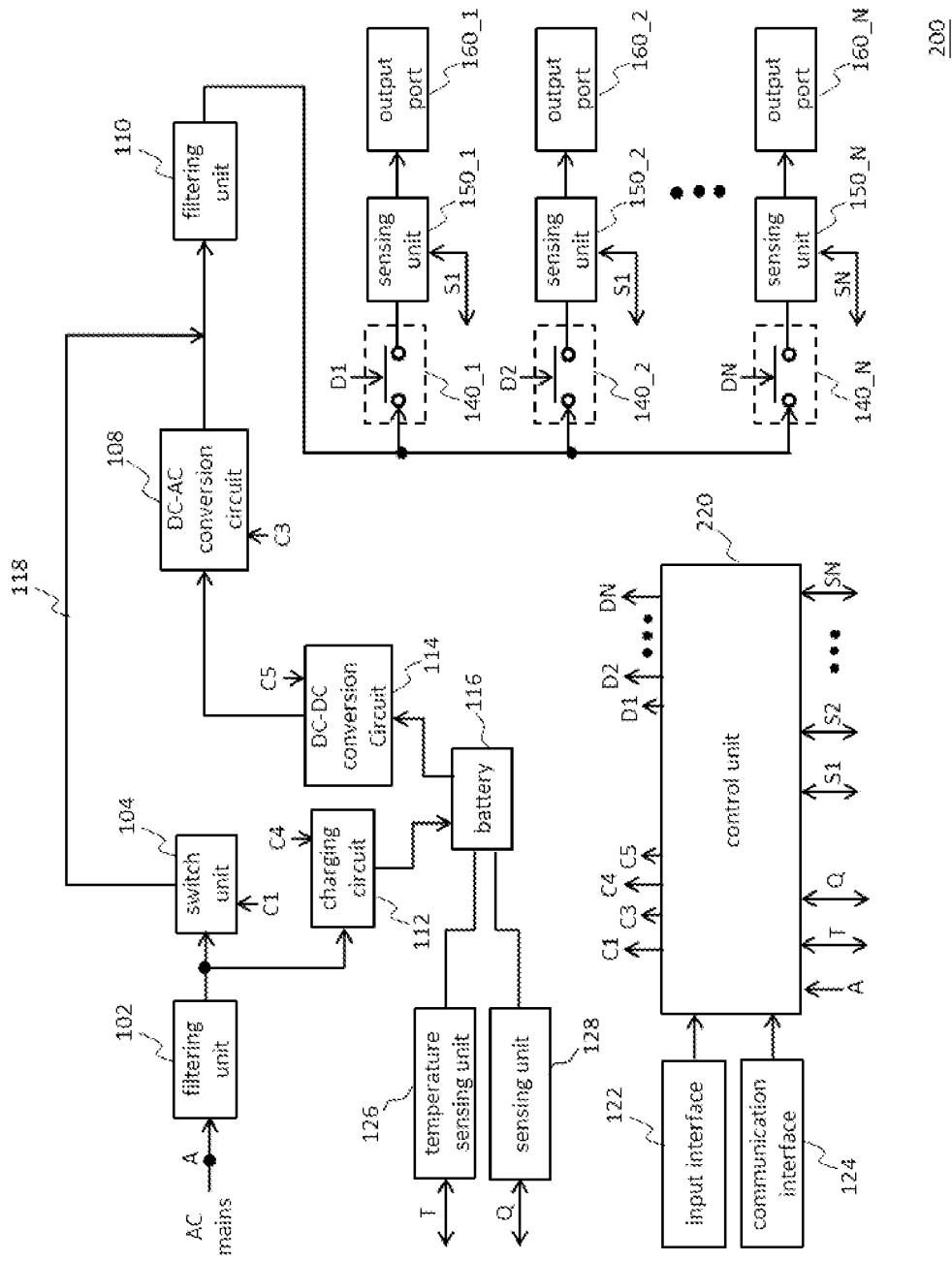
FIG. 2 is an uninterruptible power system according to another embodiment of the present invention.
Figure 3:
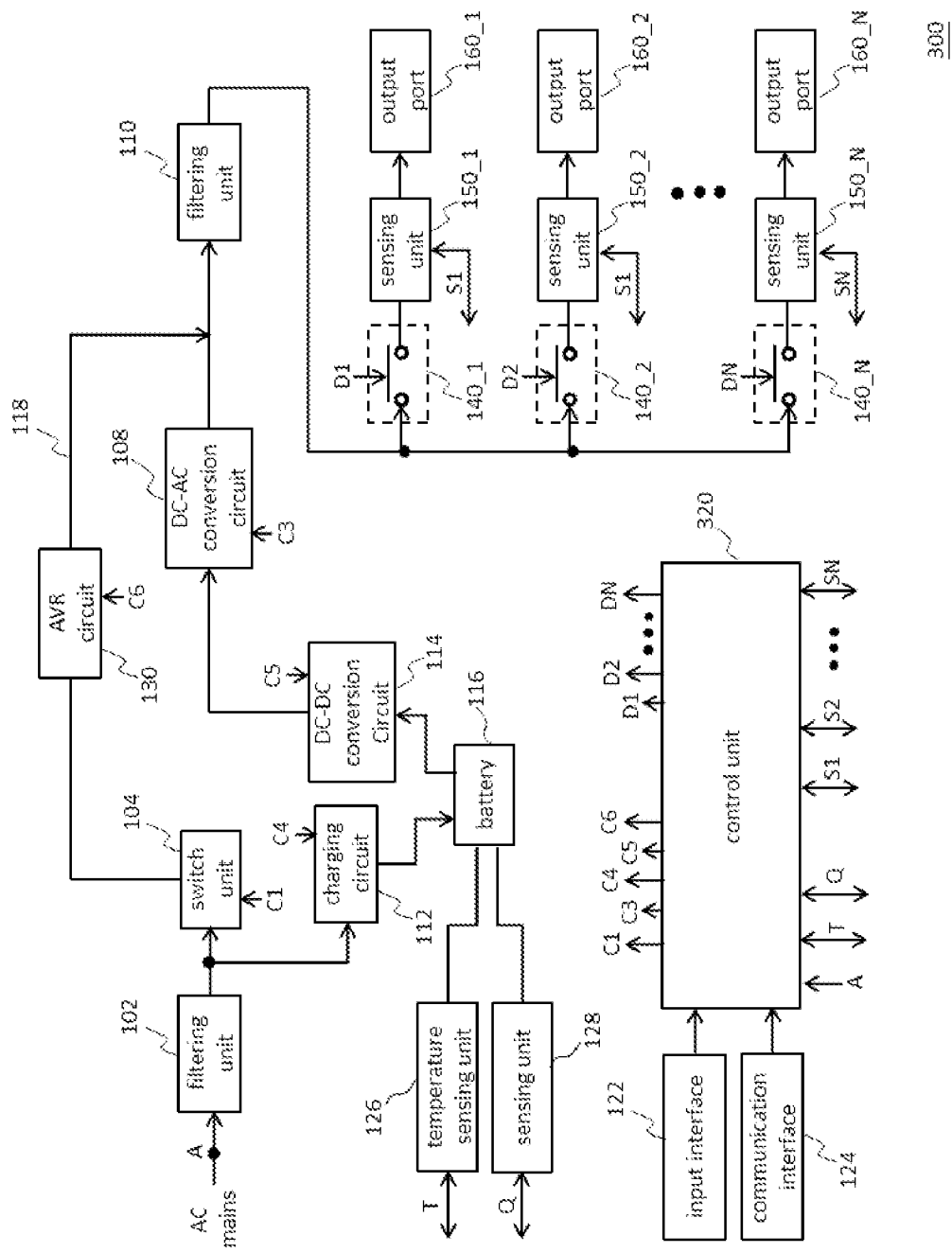
FIG. 3 is an uninterruptible power system according to still another embodiment of the present invention.

Similarly, the functions performed by the aforementioned uninterruptible power system 100 can also be applied to uninterruptible power systems of different architectures, as illustrated in FIGS. 2 and 3, respectively. FIG. 2 is an uninterruptible power system according to another embodiment of the present invention. In FIG. 2, the same reference numerals as those in FIG. 1 are denoted as the same members. As shown in FIG. 2, the uninterruptible power system 200 is an off-line uninterruptible power system (Off-line UPS). Compared with the uninterruptible power system 100 shown in FIG. 1, the uninterruptible power system 200 shown in FIG. 2 does not adopt any power factor correction circuit, so the control unit 220 of the uninterruptible power system 200 does not need to provide the control signal C2. In this embodiment, the control unit 220 is configured to define members of at least one group from the output ports 160_1-160_N according to a system setting inputted by a user, and define which members of each group are non-critical output ports according to the system setting. In addition, the control unit 220 is further configured to set, according to the system setting, at least one condition for all non-critical output ports in each group to simultaneously stop supplying power, and to accordingly control the operations of the corresponding switches.

FIG. 3 is an uninterruptible power system according to still another embodiment of the present invention. In FIG. 3, the same reference numerals as those in FIG. 2 are denoted as the same members. As shown in FIG. 3, the uninterruptible power system 300 is a line-interactive uninterruptible power system (Line-interactive UPS). Compared with the uninterruptible power system 200 shown in FIG. 2, since the uninterruptible power system 300 shown in FIG. 3 additionally adopts an automatic voltage regulation circuit (AVR circuit) 130, the control unit 320 of the uninterruptible power system 300 needs to additionally provide an control signal C6 to control the operation of the automatic voltage adjustment circuit 130. In this embodiment, the control unit 320 is configured to define members of at least one group from the output ports 160_1-160_N according to a system setting inputted by a user, and define which members of each group are non-critical output ports according to the system setting. In addition, the control unit 320 is further configured to set, according to the system setting, at least one condition for all non-critical output ports in each group to simultaneously stop supplying power, and to accordingly control the operations of the corresponding switches.

Figure 4:
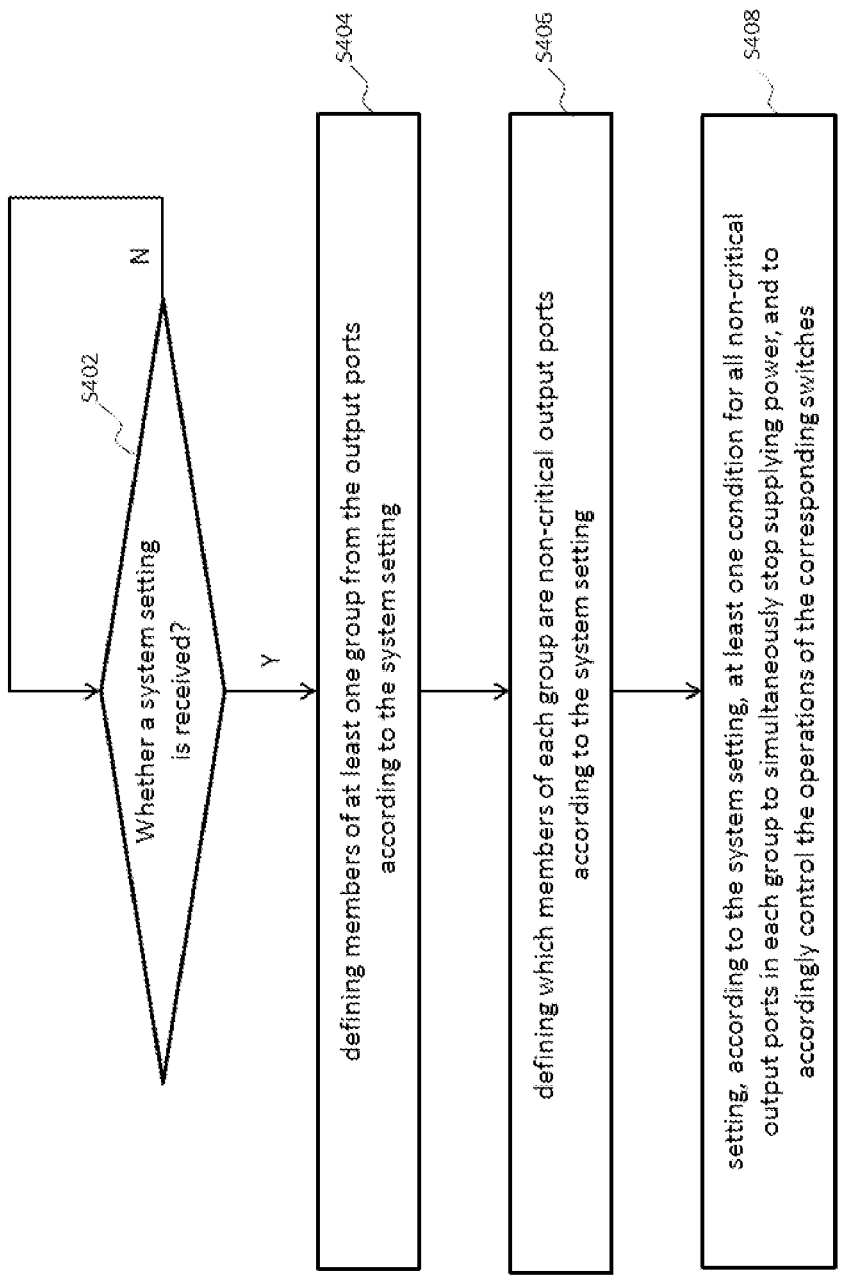
FIG. 4 is a flowchart of an operation method of an uninterruptible power system according to an embodiment of the present invention.

Based on the above description, a person skilled in the art can conclude some basic operation steps of the uninterruptible power system of the present invention, as illustrated by FIG. 4. FIG. 4 is a flowchart of an operation method of an uninterruptible power system according to an embodiment of the present invention. The uninterruptible power system comprises a DC-AC conversion circuit, a plurality of switches, a plurality of sensing units and a plurality of output ports. Each switch has a first terminal, a second terminal and a control terminal, and the first terminal of each switch is electrically coupled to an output terminal of the DC-AC conversion circuit. An input terminal of each sensing unit is electrically coupled to the second terminal of one of the switches for sensing at least one of voltage and current. Each output port is electrically coupled to an output terminal of one of the sensing units. Referring to FIG. 4, first, the control unit of the uninterruptible power system determines whether a system setting inputted by a user is received (as shown in step S402). When the determination is no, the control unit returns to step S402; on the other hand, when the determination is yes, the control unit defines members of at least one group from the output ports according to the system setting (as shown in step S404).

After performing step S404, the control unit defines which members of each group are non-critical output ports according to the system setting (as shown in step S406). Then, the control unit sets, according to the system setting, at least one condition for all non-critical output ports in each group to simultaneously stop supplying power, and to accordingly control the operations of the corresponding switches (as shown in step S408).

Certainly, in step S408, the parameters considered in the conditions comprise at least one of power consumption of load, whether the AC mains fails, remaining energy of the battery of the uninterruptible power system, temperature of the battery of the uninterruptible power system, internal temperature of the uninterruptible power system, ambient temperature outside the uninterruptible power system, and a set counting time.

In summary, since the uninterruptible power system of the present invention can define members of at least one group from the output ports according to a system setting inputted by a user, the uninterruptible power system of the present invention is more flexible in use than the conventional uninterruptible power systems.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An uninterruptible power system, comprising:
    a DC-AC conversion circuit;
    a plurality of switches, each switch having a first terminal, a second terminal and a control terminal, and the first terminals being electrically coupled to an output terminal of the DC-AC conversion circuit;
    a plurality of sensing units, an input terminal of each sensing unit being electrically coupled to one of the second terminals for sensing at least one of voltage and current;
    a plurality of output ports, each output port being electrically coupled to an output terminal of one of the sensing units; and
    a control unit, electrically coupled to the DC-AC conversion circuit, the control terminals and the sensing units, the control unit being configured to define members of at least two groups from the output ports according to a system setting, and define which members of each group are non-critical output ports according to the system setting, the control unit being further configured to set, according to the system setting, a plurality of conditions for all non-critical output ports in each group to simultaneously stop supplying power, and to accordingly control the operations of the corresponding switches,
    wherein at least one of the conditions is different between different said groups, and
    wherein whether power is supplied to the non-critical output ports of one said group depends on the conditions set for the one said group and not on the conditions set for another said group.

2. The uninterruptible power system as claimed in claim 1, wherein the parameters considered in the conditions comprise at least two of: power consumption of a load, whether an AC mains fails, remaining energy of a battery of the uninterruptible power system, temperature of the battery of the uninterruptible power system, internal temperature of the uninterruptible power system, ambient temperature outside the uninterruptible power system, and a set counting time.

3. The uninterruptible power system as claimed in claim 1, further comprising an input interface, wherein the control unit is further electrically coupled to the input interface to receive the system setting through the input interface.

4. The uninterruptible power system as claimed in claim 3, wherein the input interface comprises a touch panel.

5. The uninterruptible power system as claimed in claim 1, further comprising a communication interface, wherein the control unit is further electrically coupled to the communication interface to receive the system setting through the communication interface.

6. The uninterruptible power system as claimed in claim 5, wherein the control unit is further configured to execute a web server program to provide a web-based user interface, and the web-based user interface is configured for a user to enter the system setting.

7. The uninterruptible power system as claimed in claim 6, wherein the web-based user interface comprises a Web interface, a SNMP interface or a Telnet interface.

8. The uninterruptible power system as claimed in claim 1, wherein the uninterruptible power system is an on-line uninterruptible power system, an off-line uninterruptible power system or a line-interactive uninterruptible power system.

9. An operation method of an uninterruptible power system, the uninterruptible power system comprising a DC-AC conversion circuit, a plurality of switches, a plurality of sensing units and a plurality of output ports, each switch having a first terminal, a second terminal and a control terminal, the first terminals being electrically coupled to an output terminal of the DC-AC conversion circuit, an input terminal of each sensing unit being electrically coupled to one of the second terminals for sensing at least one of voltage and current, each output port being electrically coupled to an output terminal of one of the sensing units, the operation method comprising the following steps:
    defining members of at least two groups from the output ports according to a system setting;
    defining which members of each group are non-critical output ports according to the system setting; and
    setting, according to the system setting, a plurality of conditions for all non-critical output ports in each group to simultaneously stop supplying power, and to accordingly control the operations of the corresponding switches,
    wherein at least one of the conditions is different between different said groups, and
    wherein whether power is supplied to the non-critical output ports of one said group depends on the conditions set for the one said group and not on the conditions set for another said group.

10. The operation method of the uninterruptible power system as claimed in claim 9, wherein the parameters considered in the conditions comprise at least two of: power consumption of a load, whether an AC mains fails, remaining energy of a battery of the uninterruptible power system, temperature of the battery of the uninterruptible power system, internal temperature of the uninterruptible power system, ambient temperature outside the uninterruptible power system, and a set counting time.

* * * * *